No. 666,552. Patented Jan. 22, 1901.
J. B. PEDRICK.
GRAIN SEPARATOR.
(Application filed Aug. 28, 1897.)
(No Model.) 3 Sheets—Sheet 1.
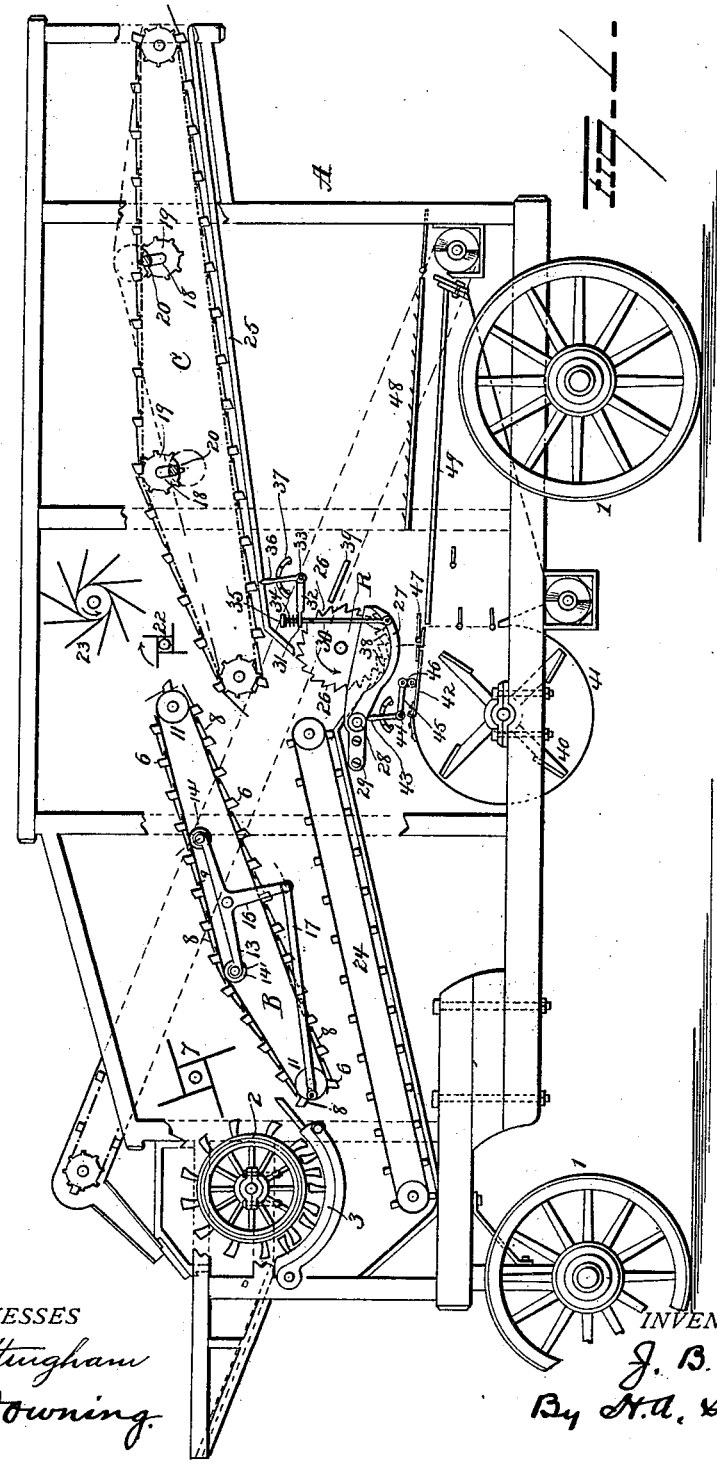
WITNESSES
E. J. Nottingham
G. F. Downing
INVENTOR
J. B. Pedrick
By N. A. Seymour
Attorney No. 666,552. Patented Jan. 22, 1901.
J. B. PEDRICK.
GRAIN SEPARATOR.
(Application filed Aug. 28, 1897.)
(No Model.) 3 Sheets—Sheet 2.
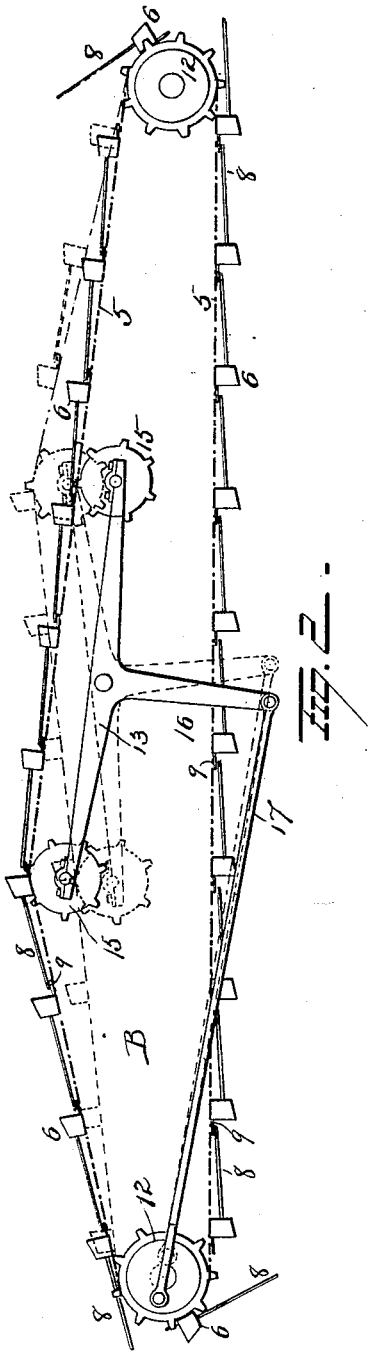
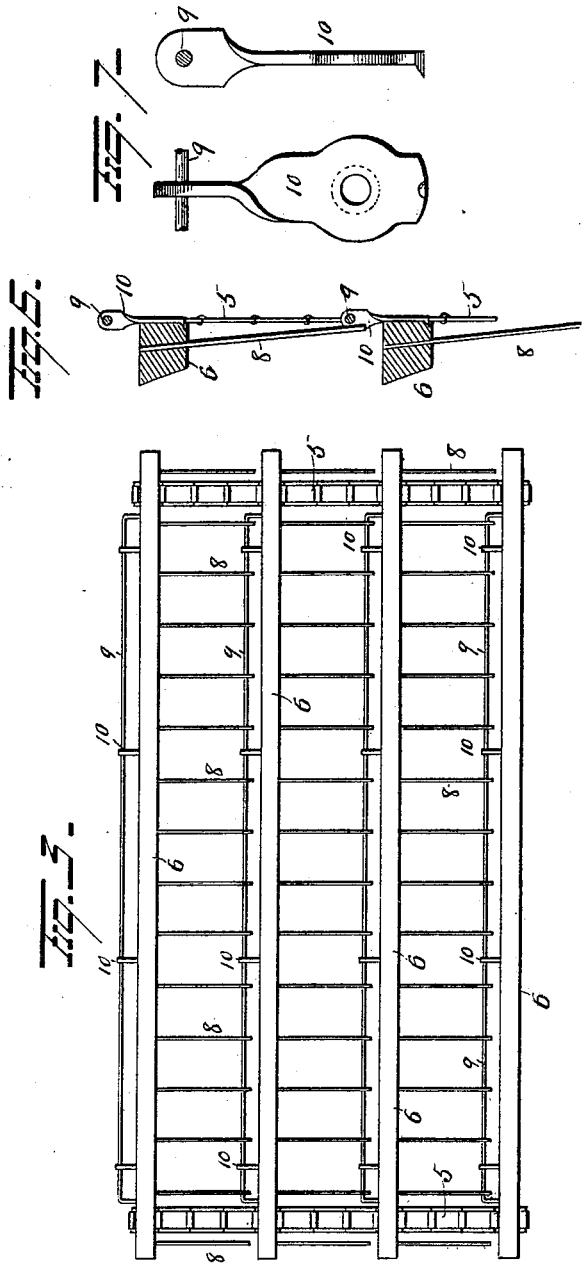
WITNESSES
INVENTOR
J. B. Pedrick
By H. A. Seymour
Attorney

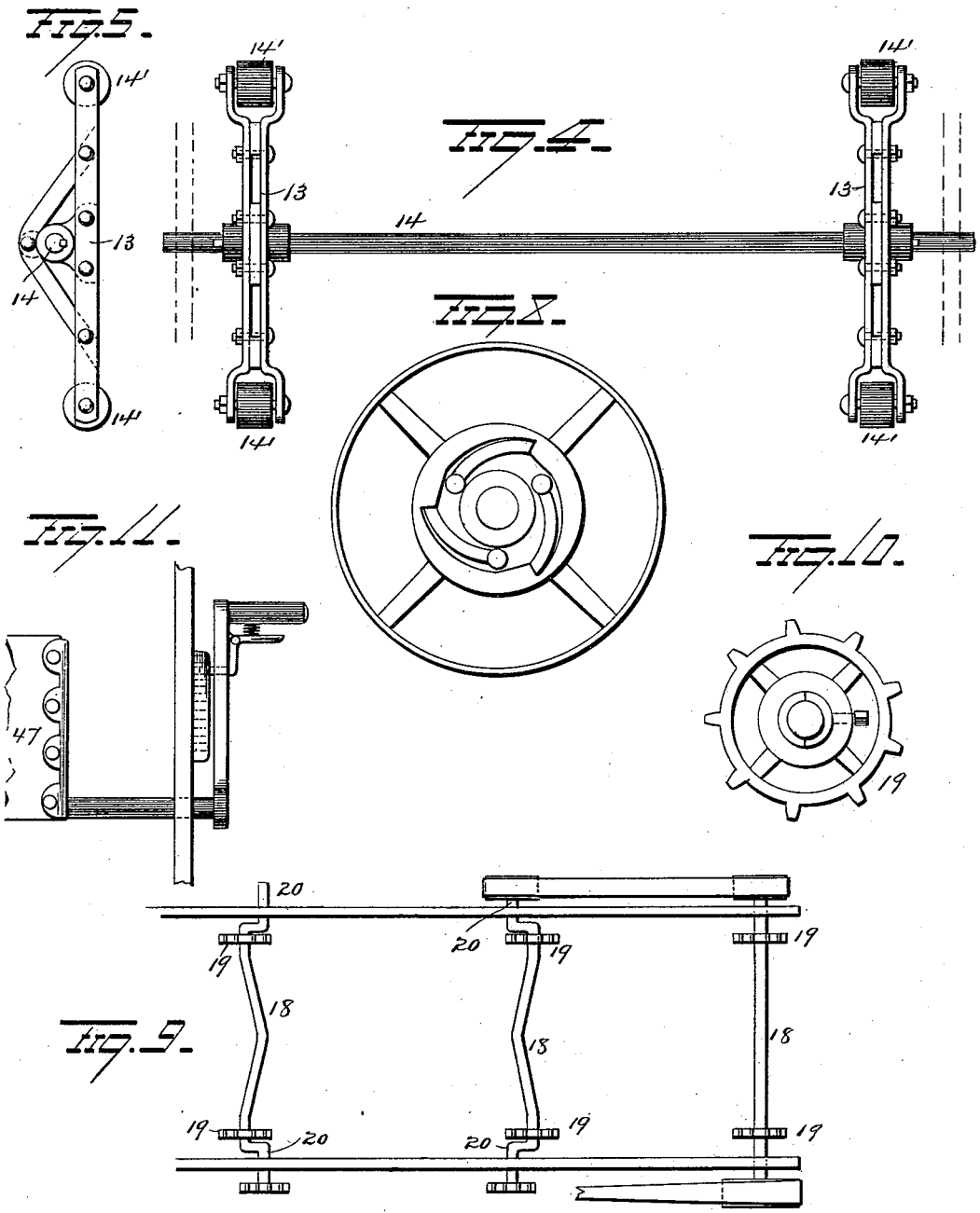

UNITED STATES PATENT OFFICE.

JOSEPH B. PEDRICK, OF COLUMBUS, INDIANA.

GRAIN-SEPARATOR.

SPECIFICATION forming part of Letters Patent No. 666,552, dated January 22, 1901.

Application filed August 28, 1897. Serial No. 649,858. (No model.)

*To all whom it may concern:*

Be it known that I, JOSEPH B. PEDRICK, a resident of Columbus, in the county of Bartholomew and State of Indiana, have invented certain new and useful Improvements in Grain-Separators; and I do hereby declare the following to be a full, clear, and exact description of the invention, such as will enable others skilled in the art to which it appertains to make and use the same.

My invention relates to an improvement in grain-separators, the object being to provide means for effectually separating the straw, grain, and chaff and distributing them in their separated condition; and it consists in certain novel features of construction and combinations of parts, which will be hereinafter described, and pointed out in the claims.

In the accompanying drawings, Figure 1 is a longitudinal section of the entire machine. Fig. 2 is a detail view of one of the carriers. Fig. 3 is a plan and elevation of a portion of a carrier in which a sprocket-chain is employed in its construction. Fig. 4 is an enlarged detail of the vibrating mechanism. Figs. 5, 6, 7, 8, 9, 10, and 11 are details of parts.

A is the frame or casing of the machine, carried in the usual manner upon suitable wheels 1 1. In the forward end is journaled the customary cylinder 2, and beneath it is located the concave 3. Extending upwardly upon an incline from this cylinder is an endless carrier B, and from beneath the rear end of this elevator B is a second endless carrier C. These carriers are similar in many respects; but as they differ in some details of construction they will be described in the order mentioned. Carrier B comprises in the main a series of two belts or sprocket-chains 5 5, as the case may be, and cross-slats 6 6, secured at their ends to the chains or belts. The slats are preferably inclined on their upper edges, as shown, in order the more readily to catch and elevate the straw and grain as it is deposited thereon by the threshing-cylinder and beater 7. A riddle of coarse mesh is formed between the slats by means of rods or wires 8 8, secured to one side of each slat below the plane of the top surface thereof and extending to or nearly to the next adjacent slat. These free ends of the rods or wires 8 8 rest lightly upon rods 9 9, which extend transversely of the carrier, said rods being supported by brackets 10 10, secured to the under side of the slats. The carrier is supported by and travels around rollers 11 11 or sprocket-wheels 12 12, by which it is driven, accordingly as belts or sprocket-chains are used, as indicated, respectively, in Figs. 1 and 2. Provision is made for constantly vibrating this carrier, and it consists of an arm 13 on each end of a rock-shaft 14, journaled in the sides of the frame or casing of the machine or casing. The outer ends of these arms are furnished with rollers 14' 14' or sprocket-wheels 15 15, over which the belts or sprocket-chains pass. One of these arms 13 is provided with a lever 16. A pitman 17 extends from an end of this lever to one of the rollers 11 or sprocket-wheels 12, and in this manner as the roller rotates the arms are vibrated. This motion keeps up a constant agitation of the carrier, and the grain is sifted and separated from the straw during its passage through the machine. As has been stated, the other carrier C is for the most part similar to carrier B. In lieu of the vibrating arms for shaking and agitating the carrier a pair of shafts 18 18, having sprocket-wheels 19 19 loose thereon, are employed. These shafts have cranks 20 20 at their ends, which are journaled in the frame or casing of the separator. The cranks of the two shafts 18 18 extend in opposite directions, so that as the shafts revolve the sprocket-wheels alternately rise and fall, lifting and dropping the carrier, thereby facilitating the shaking, spreading, and separation of the grain and straw. In the carriers the rollers 14 and wheels 19 (which with the parts that move them constitute agitators) are disposed above lines passing longitudinally through said carriers and through the bearings thereof. A beater 22 and toothed drum 23 are located in and above the space between the two carriers. These rotate and insure the passage of the material from one carrier to the other.

Beneath the carrier B is located an upwardly-inclining drag-carrier 24, and beneath the carrier C is an inclining board 25, against which the slats travel downward in their return passage, thereby sweeping any grain dropping thereon downward to the scouring and distributing drum. R represents this drum. It is provided with a series of inclined planes 26 26, extending its full length. This drum is rotated rapidly, and coöperating with it is a concave 27. The latter is hinged at 28 to a plate 29. With its free end a rod 30 is pivotally connected. This rod extends up loosely through an eye 31 in the arm 32 of the rod 33, and a spring 34 above the eye sustains the free end of the concave by bearing upwardly beneath the head 35 on the rod. The rod 33 may be turned to raise and lower the concave by setting the arm 36 in its outer end between teeth of the segment 37. Within the concave are provided inclined planes 38 38, which extend in the reverse direction from those on the scouring-drum. A fender 39 is located in rear of the scouring-drum in position to prevent the grain from being thrown too far by the drum in its rotation.

Beneath the scouring-drum is located a fan 40. A casing 41 extends around this fan. It is provided with a hinged section 42. This is raised and lowered by a handle 43, which extends outside of the frame or casing and locks into a segment thereon. The handle is on the end of a shaft or rod 44, and an arm 45 on this shaft or rod is connected by means of a link 46 to the hinged section 42. A blast-board 47 regulates the discharge and direction of the blast of air from the fan upon the riddles 48 and 49.

The various parts are driven by belts (not shown) passing over pulleys on the shafts of the several parts to be driven. Conveyers, elevators, and such other accessories as are commonly used in similar machines are employed in this.

Slight changes might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a grain-separator, the combination with a carrier consisting of a frame, sprocket-wheels mounted in said frame, sprocket-chains passing over said sprocket-wheels, and cross-slats connecting said sprocket-chains, of two cranks disposed within said carrier and spaced apart, and two sprocket-wheels mounted loosely on each crank and all in constant mesh with the sprocket-chains of the carrier, whereby, when the cranks are operated, the carrier will be vibrated without hammer or jarring effect and impart motion to the carrier.

2. In a grain-separator, the combination with end supports, of an endless carrier passing over the same and comprising parallel chains or bands and cross-slats secured to and connecting said chains or bands, means located within the carrier at respective sides of the longitudinal center thereof and in constant engagement with the carrier and devices for operating said means to raise and lower the carrier bodily alternately at respective sides of its longitudinal center.

3. In a grain-separator, the combination with an endless carrier comprising parallel chains or bands and slats connecting said chains or bands, and end supports for said chains or bands, of two sets of wheels mounted within the carrier at respective sides of the longitudinal center thereof and in constant engagement with the carrier and means for raising and lowering all the wheels of each set in unison and for so operating the respective sets of wheels alternately.

4. In a grain-separator, the combination with an endless carrier and end supports therefor, said carrier comprising a series of chains or bands and a series of cross-slats connecting said chains or bands, of cranks having bearings for wheels at respective sides of the longitudinal center of the carrier, two series of wheels mounted on said bearings so as to support the carrier at respective sides of the longitudinal center of the carrier, and means for operating said cranks to raise and lower all the wheels of each set simultaneously and operate the respective sets of wheels alternately.

5. In a grain-separator, the combination with end supports and a carrier passing over said end supports, said carrier comprising a series of chains or bands and cross-slats connecting said chains or bands, of two shafts passing through the carrier at respective sides of the longitudinal center thereof, each shaft having a series of cranks equal to the number of chains or bands and all the cranks of each shaft projecting in the same direction, a wheel mounted on each crank and in constant engagement with the carrier and means for operating the crank-shafts to raise all the wheels on each simultaneously and raising the respective sets of wheels alternately.

6. In a grain-separator, the combination with end supports, of a series of endless chains or bands passing over said end supports, a series of cross-slats connecting said chains or bands, a series of fingers supported by each cross-slat and projecting toward the next adjacent cross-slat, a series of wheels mounted within the carrier between the center and each end of the carrier and in constant engagement with the chains or bands and means for raising and lowering all the wheels of each series simultaneously and for operating the respective series of wheels alternately.

7. An endless carrier comprising belts or chains, cross-slats, brackets secured to the under sides of each cross-slat, rods extending through these brackets and lying parallel with the cross-slats, short rods or wires projecting from each cross-slat below the plane of the top surface of the slat and extending toward the next adjacent cross-slat with their free ends resting loosely upon the parallel rod of said cross-slat.

8. In a grain-separator, the combination with an endless carrier comprising belts or chains, of cross-slats connected at their respective ends thereto, brackets secured to and projecting rearwardly from the bottoms of said cross-slats, rods mounted at their ends in said brackets, wires projecting from said cross-slats, the wires on one slat resting at their free ends on the rod carried by the adjacent cross-slat so as to be normally disposed in planes below the top surfaces of the cross-slats and means disposed under the belts or chains for raising and lowering them, substantially as set forth.

In testimony whereof I have signed this specification in the presence of two subscribing witnesses.

JOSEPH B. PEDRICK.

Witnesses:
L. L. TAYLOR,
G. A. FERGUSON.